United States Patent [19]

Marino

[11] Patent Number: 4,959,531
[45] Date of Patent: Sep. 25, 1990

[54] ALIGNMENT SENSING AND CORRECTING ASSEMBLY FOR AN OPTICAL ELEMENT

[75] Inventor: Philip F. Marino, Rochester, N.Y.

[73] Assignee: Eastman Kodak Company, Rochester, N.Y.

[21] Appl. No.: 414,558

[22] Filed: Sep. 29, 1989

[51] Int. Cl.$^5$ ................................................ G01J 1/20
[52] U.S. Cl. .................................. 250/201.9; 350/611
[58] Field of Search .......................... 250/201.9, 203.1; 350/611, 613

[56] References Cited

U.S. PATENT DOCUMENTS

| | | | |
|---|---|---|---|
| 3,967,899 | 7/1976 | O'Meara | 350/611 |
| 4,618,223 | 10/1986 | Fried | 350/611 |
| 4,875,765 | 10/1989 | Vandenberg et al. | 350/611 |

Primary Examiner—David C. Nelms
Attorney, Agent, or Firm—Stephen C. Kaufman

[57] ABSTRACT

An assembly suitable for restoring and retaining a desired curvature profile for an optical system. The optical system may comprise a base structure, and a plurality of displacement actuators for positioning at least one of a plurality of optical elements, for example, mirrors, to the base structure, so that the optical elements have a desired curvature profile. Arbitrary and deleterious inputs to the optical system, which may tend to misalign the optical elements, thereby vitiating the desired curvature profile, are sensed by the assembly. The assembly computes new displacement actuator commands, for restoring the desired curvature profile.

8 Claims, 4 Drawing Sheets

ALIGNMENT SENSING AND CORRECTING ASSEMBLY FOR AN OPTICAL ELEMENT

CROSS-REFERENCE TO RELATED APPLICATION

This application is related to a copending and commonly assigned Patent Application Serial No. 07/225,901 filed July 29, 1988, to Marino et al. The entire disclosure of the copending application is incorporated by reference herein.

BACKGROUND OF THE INVENTION

1. Field of the Invention

This invention relates to an assembly that can provide alignment adjustments for an optical system.

2. Introduction to the Invention

I have been working with optical systems that typically comprise a base structure, at least two optical elements, and a plurality of displacement actuators that position at least one of the optical elements to the base structure. FIG. 1 shows an example of such an optical system. Here, an optical system 10 includes a base structure 12, and a set of displacement actuators 14. The displacement actuators 14 position two optical elements, namely, a center mirror segment 16, and an associated outer mirror segment 18, or petal, to the base structure 12. (Other, typically included petals, are not fully shown.)

In an ideal employment of the FIG. 1 optical system 10, it is desirable to align the center mirror segment 16 and the petal 18, so that the optical elements define and retain a first curvature profile. For example, in optical systems that I am working on, a first curvature R may have a numerical value of R=10.0 meters, and it is desired, moreover, that it retain this value under arbitrary operating conditions, and to a very high degree of accuracy, for example R=10.0 meters ± 0.5 mm.

SUMMARY OF THE INVENTION

In contrast to the ideal employment of the FIG. 1 optical system 10, I have found that arbitrary inputs to the system, including spurious mechanical vibrations, or thermal or structural distortions introduced by way of, for example, the base structure 12 or displacement actuators 14, may misalign the optical elements 16, 18, thereby inducing an unacceptable, second curvature profile, well outside of the desired first curvature range.

As indicated in the above-referenced Application Serial No. 07/225,901, it is possible to compensate for the deleterious, arbitrary inputs, thereby restoring the first curvature profile, by way of, for example, a continuously powered optical sensing means, including camera and control system apparatus, coupled with a force/actuator feedback system. This compensation procedure, however, may not be a universally viable procedure. For example, I am working with optical systems that may be employed in adverse or unusual environments, like orbiting space capsules, where it maY not be possible or efficient to continually power the optical sensing means, thus thwarting the restoration of the alignment of the optical elements and the first curvature profile.

Accordingly, in recognition of the desirability of providing and retaining a first curvature profile, independent of arbitrary, spurious inputs to an optical system, and not restricted to the employment of the continuously powered sensing system, I now disclose an optical system comprising:

(a) a base structure;
(b) at least two optical elements; and
(c) a plurality of displacement actuators for positioning at least one of the optical elements to the base structure in accordance with a known displacement matrix [D], so that the optical elements define a first curvature profile; the present invention comprising an assembly comprising:
  (1) a plurality of sensing means (a) positioned in accordance with a known position matrix [P] which is calculated based upon the position of each of the sensing means with respect to each of the optical elements; the sensing means (b) sensing changes in the first curvature profile, due to arbitrary inputs to the optical system; and providing a corresponding plurality of sensing output signals [S]; and
  (2) a computation means for:
    (a) inputting the plurality of sensing output signals [S];
    (b) inputting the position [P] and displacement matrices [D]; and
    (c) computing, on the basis of the sensing output signals [S], and the position [P] and displacement [D] matrices, at least one displacement actuator command [C], whereby, a realization of displacement actuator repositioning, in accordance with the or each displacement actuator command [C], restores the system first curvature profile.

An important advantage of the present invention is that the assembly does not require any mechanical contacts between the optical elements and the sensing means. This feature reduces the risk of damage, or undesirable elastic deformation of the optical elements.

Another important advantage of the present invention is that a location stability of the sensing means is not critical to the sensing means ability to sense changes in the first curvature profile, so long as changes in the position of the sensing means are within the sensing means range of sensitivity.

BRIEF DESCRIPTION OF THE DRAWING

The invention is illustrated in the accompanying drawing in which:

FIGS. 3A, 2B show top and side views, respectively, of a sub-assembly of the FIG. 2 assembly, to thus explain a displacement matrix [D] of the present invention; and FIGS. 4A, 2B show top and side views, respectively, of further details of the FIG. 2 assembly, to thus explain a position matrix [P] of the present invention.

DETAILED DESCRIPTION OF THE INVENTION

Figure 1:
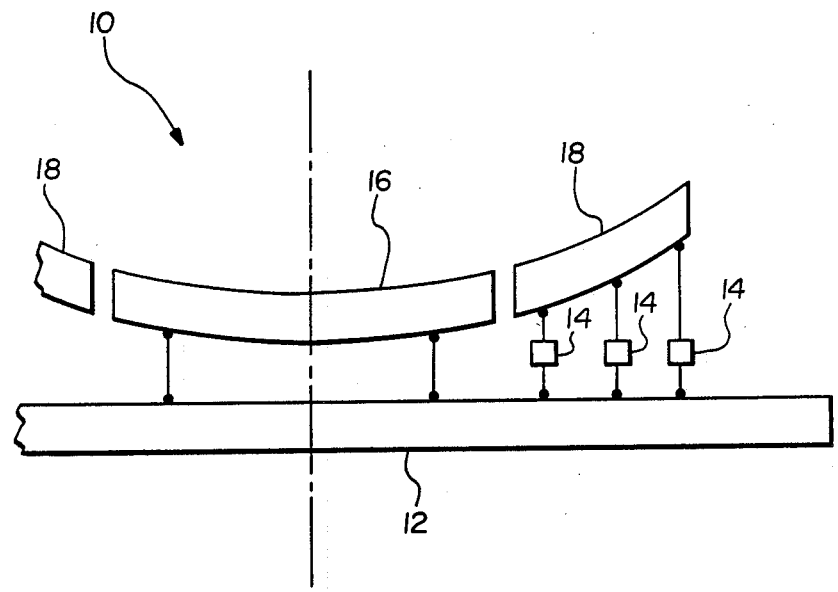
FIG. 1 shows a prior art optical system.
Figure 2A:
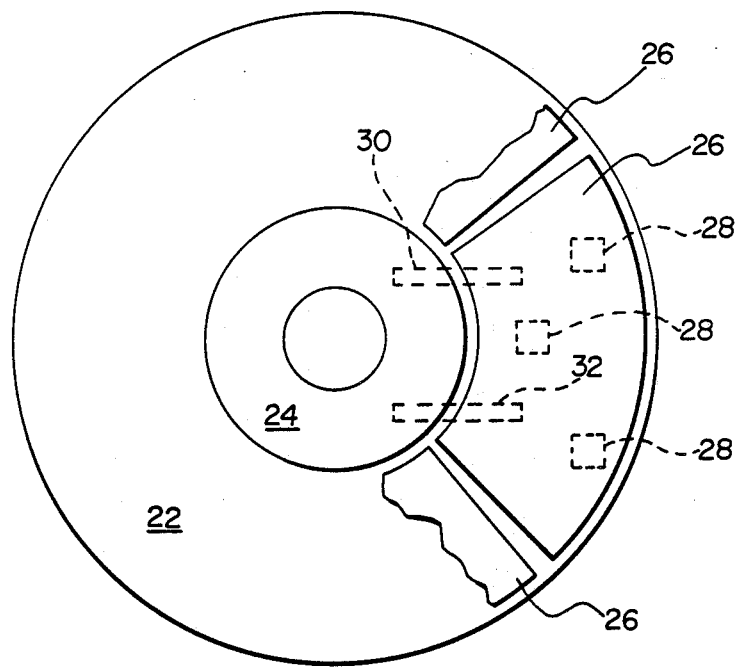
FIGS. 2A, 2B show top and side views, respectively, of an assembly of the present invention.

Attention is now directed to FIGS. 2A, B (top, side views, respectively), which show an assembly 20 of the present invention. The components (a–g) of the assembly 20 will first be disclosed, followed by a specification of the operation of the assembly 20.

Figure 2B:
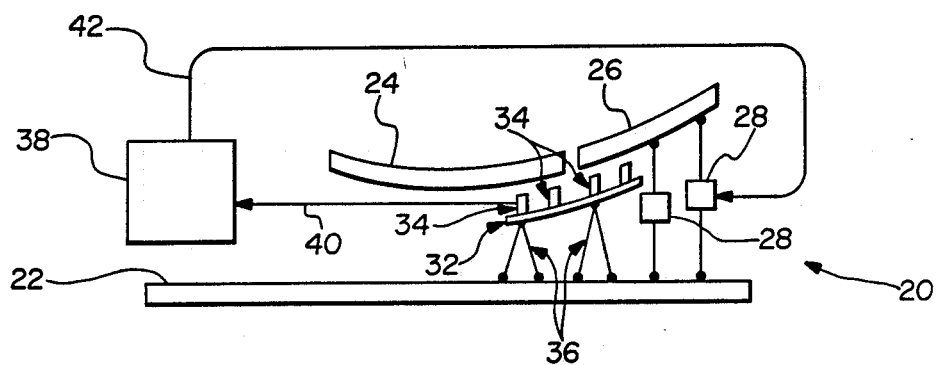

In overview, the FIG. 2 assembly 20 includes the following components:

(a) a base structure 22, preferably comprising an elongate, monolithic element comprising a graphite/epoxy composite. The coefficient of thermal expansion of such a composite is preferably 0.0 ppm/° c. to ± 100 ppm/° c.;

(b) a center mirror segment 24, preferably comprising a fused silica composition, for example, a light weight glass composition;

(c) an array of mirror petals 26, spaced around the center mirror segment 24;

(d) a plurality of displacement actuators 28 for positioning at least one of the center mirror segment 24 or mirror petals 26, to the base structure 22. The displacement actuators 28 may be conventional such devices, preferably comprising a rigid, fixed member made of a thermally stable material. The displacement actuators 28 may act directly on a back surface of the center mirror segment 24 or mirror petals 26, or may act on a tab structure (not shown) which may be fixed to the mirror segment 24 or petals 26;

(e) a mounting means comprising first and second thermally stable rigid bars (30, 32) for mounting, by conventional bonding techniques, and with respect to the mirror segment 24 and petals 26, an array of sensing means 34. A conventional set of mounting brackets 36, in turn, may be employed to kinematically support the rigid bars 30, 32 to the base structure 22;

(f) the sensing means 34 preferably comprise a plurality of conventional capacitor transducers and/or eddy current transducers 34. The transducers 34 output a sensing output signal, which signal is preferably defined by a matrix [S]. Preferably, the transducers 34 define a sensor axis (↑), which axis (↑), as shown, is substantially normal to a selected portion of the petal 26. (Note, in contrast, that if a sensor axis is not originally maintained at the preferred normal to the petal 26, then subsequent petal 26 radial motions, due to perturbances of the petal 26, may not, in fact, be sensed by the transducers. On the other hand, initially maintaining the sensor axis at the normal to the petal 26, optimizes the sensing of subsequent radial, as well as axial, movements of the petal 26); and (g) a computation means 38 comprising a conventional microprocessor, and inputting, along a line 40, sensing output signals [S] outputted by the capacitor and/or eddy current transducers 34. The computation means 30 outputs, along a line 42, a command to a displacement actuator 28, the command preferably defined by a command matrix [C].

It may be assumed that the assembly 20, so structured, comprises optical elements, namely the center mirror segment 24 and the mirror petals 26, which define a desired first curvature profile.

The operation of the assembly 20, as summarized above, first requires defining a displacement matrix [D], which matrix [D] specifies a correlation between the positioning of at least one of the mirror segment 24 or petals 26, with respect to the base structure 22, and a displacement actuator command.

Figure 3A:
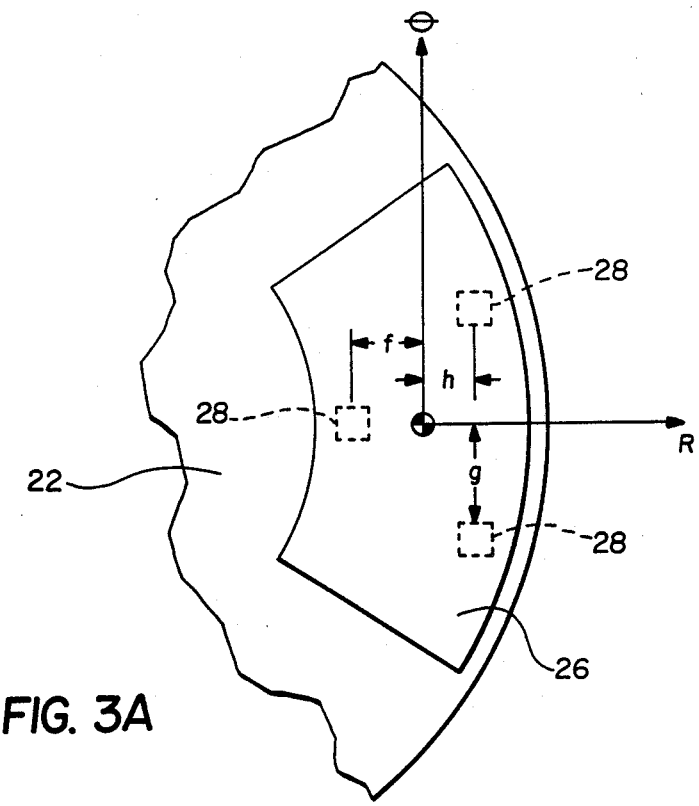

To facilitate an understanding of the definition of a representative displacement matrix [D], attention is now directed to FIGS. 3A, B which show top and side views, respectively, of a sub-assembly comprising one of the mirror petals 26, and three displacement actuators 28 connected to the mirror petal 26 and the base structure 22. This sub-assembly is embedded in an (R, Z, θ) coordinate system. The metrics g, h, and f specify, respectively, the locations of the displacement actuators 28, with respect to the coordinate system axes, and the center of mirror petal 26.

For this exemplary geometry, the displacement matrix [D] is given by:

$$[D] = \begin{bmatrix} 1.0 & +h & +g \\ 1.0 & +h & -g \\ 1.0 & -f & 0.0 \end{bmatrix} \quad (1)$$

Figure 3B:
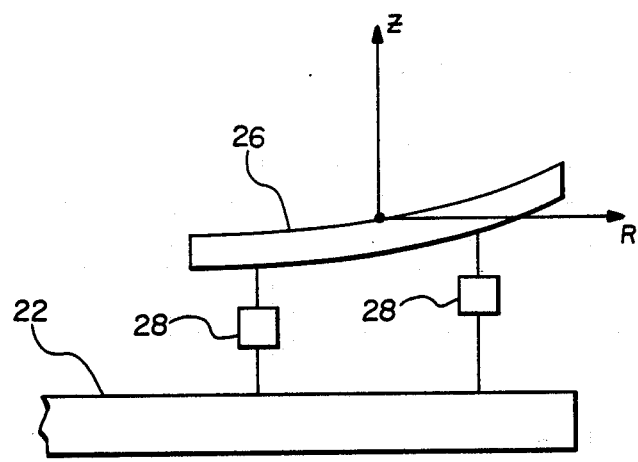

Here, the displacement matrix [D] is a 3×3 matrix, where the 3 rows are dedicated, respectively, to each of the three displacement actuators 28 connected to the mirror petal 26. In particular, for this FIG. 3 embodiment, the 3 displacement actuators 28 are each parallel to the z axis. The 3 columns of the 3×3 matrix, on the other hand, are dedicated, respectively, to the following three actions:

$$(1) \text{ first column} = \begin{bmatrix} 1.0 \\ 1.0 \\ 1.0 \end{bmatrix} \text{ i.e.,}$$

to make the mirror petal 26 move 1 unit in the z direction, to thus restore the original first curvature profile, now dislocated, presumptively, because of an arbitrary assembly 20 input perturbation, all 3 actuators must move 1 unit in the Z direction;

$$(2) \text{ second column} = \begin{bmatrix} h \\ h \\ -f \end{bmatrix} \text{ i.e.,}$$

to make the mirror petal 26 rotate 1 unit about the θ axis, to thus restore the original first curvature profile, now dislocated, presumptively, because of an arbitrary assembly 20 input perturbation, all 3 displacement actuators 28 must move a distance h, h, −f, units, respectively, in the Z direction; and $$(3) \text{ third column} = \begin{bmatrix} +g \\ -g \\ 0.0 \end{bmatrix} \text{ i.e.,}$$

to make the mirror petal 26 rotate 1 unit about the R axis, to thus restore the original first curvature profile, now dislocated, presumptively, because of an arbitrary assembly 20 input perturbation, all 13 displacement actuators 28 must move a distance g, −g, 0.0, units, respectively, in the Z direction.

The displacement matrix [D], so defined, may be provided as a (pre-loaded) programming input to the microprocessor 38. The further utilization of the displacement matrix [D], in the microprocessor 38, is reserved for further treatment, below, and in an Appendix.

The operation of the assembly 20, as summarized above, secondly requires defining a position matrix [P], which matrix [P] is calculated based upon the position of each of the sensing means 34 with respect to each of the optical elements, namely, the center mirror segment 24, and the mirror petals 26.

Figure 4A:
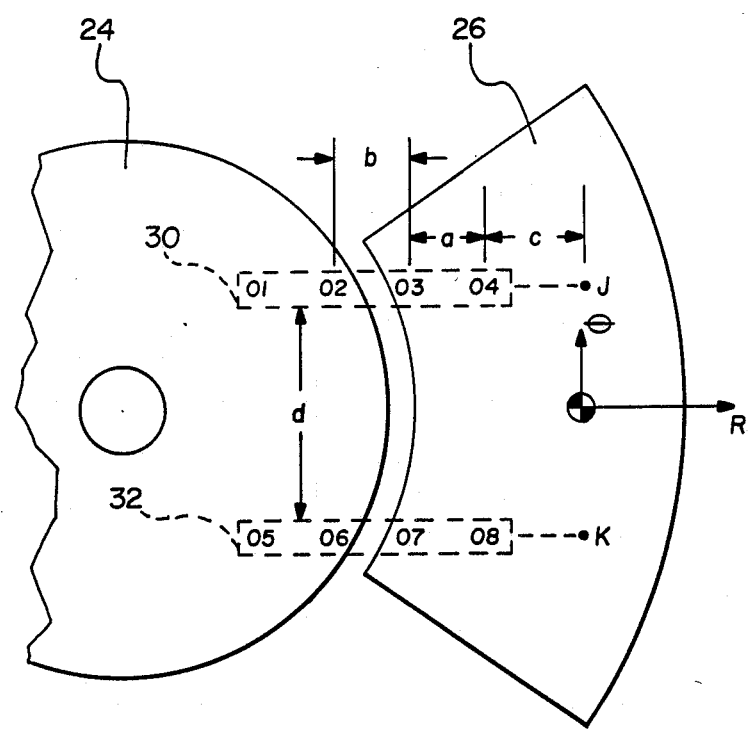

To facilitate an understanding of the development of a representative position matrix [P], attention may be directed to FIGS. 4A, b. These figures show top and side views, respectively, of the center mirror segment 24, the mirror petal 26, and two rigid bars 30, 32. Eight sensing means 34 (here given numerals 01-08) are bonded to the rigid bars 30, 32. A set of parameters a, b, c, d is used to denote distances, according to the following scheme:

a = distances between sensors (1,2) (3,4) (5,6) (7,8)
b = distance between sensors (2,3) (6,7)
c = distance between sensor 4 and the center of the mirror petal 26
d = distance between the two rigid bars 30, 32.

For this exemplary geometry, the position matrix [P] is given by:

$$[P] = \begin{bmatrix} \frac{(a+b+c)}{2a} & \frac{-(2a+b+c)}{2a} & \frac{-c}{2a} & \frac{a+c}{2a} & \frac{a+b+c}{2a} & \frac{-(2a+b+c)}{2a} & \frac{-c}{2a} & \frac{a+c}{2a} \\ \frac{-1}{2a} & \frac{-1}{2a} & \frac{-1}{2a} & \frac{-1}{2a} & \frac{-1}{2a} & \frac{-1}{2a} & \frac{-1}{2a} & \frac{-1}{2a} \\ \frac{b}{2ad} & \frac{-(2a+b)}{2ad} & \frac{2a+b}{2ad} & \frac{-b}{2ad} & \frac{-b}{2ad} & \frac{2a+b}{2ad} & \frac{-(2a+b)}{2ad} & \frac{b}{2ad} \end{bmatrix} 3 \times 8 \quad (2)$$

Each of the three rows of [F] is dedicated to one of the petal 26 motions represented in the $(R, Z, \theta)$ coordinate system. That is, the first row is dedicated to pure translation of the petal 26 in the Z direction; the second row is dedicated to rotation of the petal 26 about the $\theta$ axis of the coordinate system; and the third row is dedicated to rotation of the petal 26 about the R axis of the coordinate system.

The position matrix [P] is generated as follows. First, note that the data [S] from any seven of the eight sensors is sufficient to calculate the motions of the petal 26. To take advantage of the redundant sensor information, therefore, and reduce the effects of sensor measurement error, the information from all eight sensors is preferably used. To accomplish this, eight different $3 \times 7$ matrices, called [P1] through [P8], are first calculated. Each of these matrices can be used to calculate an interim matrix [Z], based on data from seven of the eight sensors, where [Z] defines the motion of the petal 26 in the $(R, Z, \theta)$ coordinate system. For example: [Z] = [P1]*[S1], where [S1] is the 7 element vector of data from sensors 2 through 8 (i.e., all eight sensors, excluding sensor 1). These eight $3 \times 7$ matrices are then combined to produce [P] as follows:

$$[P](i,j) = \frac{1}{8} \sum_{k=1}^{8} [Pk](i,j) \quad (3)$$

As an example, element [P8](1,1) may be calculated as follows. [P8](1,1) represents the Z axis motion of the petal 26 centroid under the following conditions:
S(1) = 1 unit
S(2) through S(7)) are 0.0
S(8) is unconstrained for this calculation.

Figure 4B:
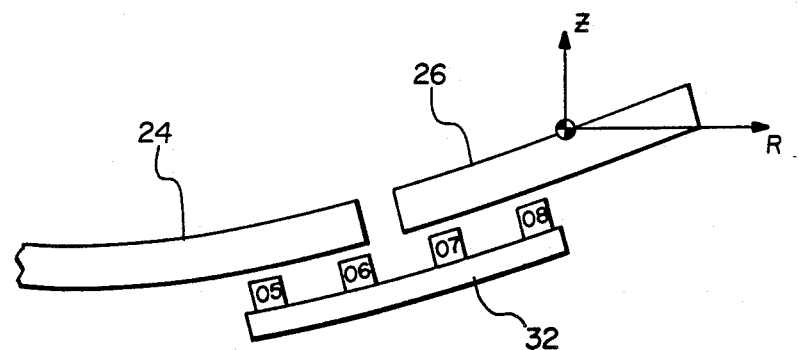

Referring to FIG. 4, for the above conditions to hold, the rigid bar, 30, along with the petal, 26, must rotate 1/a radians in the negative $\theta$ direction. This results in a motion of a reference point J, where J is fixed to the petal, located on the $\theta$ axis, and axial to the bar 30, of $[a+b+c]/a$ units in the positive Z direction. Rigid bar 32 remains motionless due to the constraint that S(5) = S(6) = 0. The petal 26, adjacent to the rigid bar, 32, will therefore rotate 1/a units in the negative $\theta$ direction about sensor 7, which also remains at 0 displacement. This results in a motion of a reference point K, which is fixed to the petal, located on the $\theta$ axis and axial to the bar 32, of $(c+a)/a$ units in the positive Z direction. The Z motion of the centroid of the petal 26 is now calculated as the center of the line between the new locations of points J and K, or:

$$[P8](1,1) = \{([a+b+c]/a) + [(c+a)/a]\}/2 =$$

$$(2a + b + 2c)/(2c).$$

The remaining elements of [P1] through [P8] may be calculated in a similar way, and the eight resulting matrices then combined, as in equation (3), to yield [P], Equation 2. The position matrix [P], so defined, may be provided as a (pre-loaded) programming input to the microprocessor 38.

To recapitulate: we have thus demonstrated the development of exemplary displacement [D], and position [P] matrices, Equations (1), (2) supra. As indicated above, the matrices [D] and [P] may be pre-loaded into the microprocessor 38. As further indicated above, the microprocessor 38 also inputs, in real time, and along the line 40, a plurality of sensing means 34 output signals, the signals preferably comprising a sensing matrix $[S]_{m \times b}$ where m is the number of individual sensing transducers. Based on the now, known, matrices [D], [P], and [S], the microprocessor 38 may be programmed to make the following two computations:
(1) a first product matrix [Z], [Z] = [P].[S] (4); and
(2) a second product matrix [C], [C] = −[D].[Z] (5).

The [Z] product matrix is an intermediary operation, to the end of producing the [C] product matrix. This last matrix [C], in turn, is a displacement actuator command matrix. Functionally, the displacement actuator command matrix [C] specifies commands for re-positioning components of the FIG. 2 displacement actuators 28, to thus cancel the arbitrary and deleterious input perturbations to the assembly 20. This last action, in turn, produces the sought for overall result: the assembly 20 may be restored to the desired first curvature profile.

---

APPENDIX

This Fortran Program calculates the desired Displacement Actuator commands, [C], which will correct for any motion of the petal (optical segment of the mirror) based on the initial geometries of the sensors (AS, BS, CS, and DS), and the actuators (F, G, and H) and the eight sensor outputs, [S]
DIMENSION D(3,8),P(3,3)S(8),Z(3),C(3)

-continued
APPENDIX

```
      READ,AS,BS,CS,DS (input the Geometry of the Sensors)
C
C     CALCULATE [P]:THE MATRIX THAT TRANSFORMS SENSOR READINGS
C     INTO PETAL MOTIONS
C
      P(1,1)=P(1,5)=(AS+BS+CS)/(2.0*AS)
      P(1,2)=P(1,6)=-(2.0*AS+BS+CS)/(2.0*AS)
      P(1,3)=P(1,7)=-CS/(2.0*AS)
      P(1,4)=P(1,8)=(CS+AS)/(2.0*AS)
      P(2,1)=P(2,4)=P(2,5)=P(2,8)=-1.0/(2.0*AS)
      P(2,2)=P(2,3)=P(2,6)=P(2,7)=1.0/(2.0*AS)
      P(3,1)=P(3,8)=BS/(2.0*AS*D)
      P(3,4)=P(3,5)=-P(3,1)
      P(3,3)=P(3,6)=(2.0*AS+BS)/(2.0*AS*DS)
      P(3,2)=P(3,7)=-P(3,3)
      READ,F,G,H (Geometry of Displacement Actuators)
C
C     Calculate [D], which converts petal motions into actuator
C     motions
C
      D(1,1)=D(2,1)=D(3,1)=1.0
      D(1,2)=D(2,2)=H
      D(3,2)=-F
      D(1,3)=+G
      D(2,3)=-G
      D(3,3)=0.0
C
C     Read eight sensor readings, [S]
C
100   READ,S
      DO 1 I=1,3
      Z(I)=0.0
      DO 1 J=1,8
1     Z(I)=Z(I)+P(I,J)*S(J)     ({Z}=[P]*{S})
C
C     PETAL DISPLACEMENT VECTOR {Z} HAS NOW BEEN CALCULATED
C
      DO 2 I=1,3
      C(I)=0.0
      DO 2 J=1,3
2     C(I)=C(I)-D(I,J)*Z(J)     ({C}=-[D]*{Z})
C
C     THE ACTUATOR COMMAND VECTOR {C} HAS BEEN CALCULATED AND IS
C     USED TO ADJUST THE PETAL. THE EIGHT SENSORS ARE READ AGAIN AND
C     A NEW {S} IS NOW USED TO REPEAT THE CALCULATION (START AT 100)
```

I claim:
1. In an optical system comprising:
   a. a base structure;
   b. at least two optical elements; and
   c. a plurality of displacement actuators for positioning at least one of the optical elements to the base structure in accordance with a known displacement matrix [D], so that the optical elements define a first curvature profile;
   an assembly comprising:
   (1) a plurality of sensing means (a) positioned in accordance with a known position matrix [P] which is calculated based upon the Position of each of the sensing means with respect to each of the optical elements; the sensing means (b) sensing changes in the first curvature profile, due to arbitrary inputs to the optical system; and providing a corresponding plurality of sensing output signals [S]; and
   (2) a computation means for:
      (a) inputting the plurality of sensing output signals [S];
      (b) inputting the position [P] and displacement matrices [D]; and
      (c) computing, on the basis of the sensing output signals [S], and the position [P] and displacement [D] matrices, at least one displacement actuator command [C],
   whereby, a realization of displacement actuator repositioning, in accordance with the or each displacement actuator command [C], restores the system first curvature profile.

2. An optical system according to claim 1, wherein at least one of the sensing means comprises an eddy current transducer.

3. An optical system according to claim 1, wherein at least one of the sensing means comprises a capacitive transducer.

4. An optical system according to claim 1, wherein at least one of the sensing means can define a sensor axis, which axis is substantially normal to a selected portion of an optical element.

5. An optical system according to claim 1, wherein the computation means comprises a computer that is programmed to compute a first product matrix [Z], $$[Z]=[P].[S]$$

where [Z] corresponds to the motion of an optical element displaced by way of an input to the optical system.

6. An optical system according to claim 5, wherein the computation means comprises a computer that is programmed to compute a displacement actuator command matrix [C],

[C] = −[D]·[Z].

7. An optical system according to claim 1, further comprising a mounting means for mounting the sensing means in an operative relationship with the optical elements.

8. An optical system according to claim 7, wherein the mounting means comprises at least one thermally stable rigid bar.

* * * * *